(12) United States Patent
Varadachari

(10) Patent No.: US 7,691,171 B2
(45) Date of Patent: Apr. 6, 2010

(54) PROCESS FOR THE MANUFACTURE OF BIO-RELEASE IRON-MANGANESE FERTILIZER

(75) Inventor: Chandrika Varadachari, Kolkata (IN)

(73) Assignee: Department of Science & Technology (DST) A Department under the Ministry of Science and Technology, Government of India, Mumbai (IN)

( * ) Notice: Subject to any disclaimer, the term of this patent is extended or adjusted under 35 U.S.C. 154(b) by 792 days.

(21) Appl. No.: 10/567,303

(22) PCT Filed: Aug. 6, 2004

(86) PCT No.: PCT/IN2004/000234
§ 371 (c)(1),
(2), (4) Date: Feb. 6, 2006

(87) PCT Pub. No.: WO2005/014505
PCT Pub. Date: Feb. 17, 2005

(65) Prior Publication Data
US 2006/0196240 A1   Sep. 7, 2006

(30) Foreign Application Priority Data
Aug. 6, 2003   (IN) .............................. 971/DEL/03

(51) Int. Cl.
*C01B 25/37* (2006.01)
*C05B 17/02* (2006.01)

(52) U.S. Cl. .............................. 71/41; 71/33; 423/306

(58) Field of Classification Search .................. 423/306; 71/33, 41
See application file for complete search history.

(56) References Cited

U.S. PATENT DOCUMENTS

| | | | |
|---|---|---|---|
| 2,713,536 A | 7/1955 | Driskell | |
| 3,244,500 A | 7/1963 | Stinson et al. | |
| 3,201,222 A | 8/1965 | Wilson | |
| 3,574,591 A | 4/1971 | Lyons et al. | |
| 3,856,500 A | 12/1974 | Cox | |

FOREIGN PATENT DOCUMENTS

| | | |
|---|---|---|
| AT | 326160 | 2/1975 |
| IN | 172800 | 12/1993 |
| IN | 177205 | 12/1996 |
| IN | 194747 | 11/2004 |
| SU | 1270148 | 11/1986 |

OTHER PUBLICATIONS

Mortvedt, John J. et al. "Micronutrients in Agriculture." Madison, Wisconsin: *Soil Science Am.*, 1972.
Sauchelli, V. (1967). *Chemistry and Technology of Fertilizers*. New York: Reinhold, pp. 434-445.
Collings, G. H. (1955). *Commercial Fertilizers*. New York: McGraw-Hill, pp. 327-363.
Roberts, Gordon J. "Preparation and Properties of Glasses in the System of FeO-$K_2O$-$P_2O_5$." *Am. Ceram. Soc. Bull.* vol. 52, No. 4 (1973), p. 383. Abstract Only.
Roberts, Gordon J. "FeO-$K_2O$-$P_2O_5$ Glasses As a Source of Micronutrient Iron in Soil." *Am. Ceram. Soc. Bull.*, vol. 54, No. 12 (1975), pp. 1069-1071.
Volfkovich, S. I. (1972). "Polymeric Fertilizers" *Journal of Applied Chemistry* (USSR) 45:2479-87.
Ray, Sanjay K., Chandrika Varadachari and Kunal Ghosh. "Novel Slow-Releasing Micronutrient Fertilizers. 2. Zinc Compounds." *Ind. Eng. Chem. Res.*, vol. 32 (Jun. 1993), pp. 1218-1227.
Ray, Sanjay K., Chandrika Varadachari and Kunal Ghosh. "Novel Slow-Releasing Micronutrient Fertilizers. 2. Copper Compounds." *J. Agric. Food Chem.*, 45 (1997), pp. 1447-1453.

*Primary Examiner*—Wayne Langel
(74) *Attorney, Agent, or Firm*—Volpe and Koenig, P.C.

(57) ABSTRACT

This invention provides a process for the preparation of water insoluble, bio-release iron-manganese fertilizer which comprises, heating phosphoric acid with a mixture of (i) source of iron oxide such as goethite and hematite, (ii) pyrolusite and (iii) one or more basic compound(s) selected from oxide(s) or carbonate(s) of magnesium, calcium, sodium and potassium, (b) neutralisation followed by drying and pulverisation.

19 Claims, No Drawings

PROCESS FOR THE MANUFACTURE OF BIO-RELEASE IRON-MANGANESE FERTILIZER

BACKGROUND OF INVENTION

1. Field of Invention

This invention relates to a process for the manufacture of bio-release types of slow-release iron-manganese fertilizer compounds wherein these micronutrients are water insoluble but are nevertheless available for plants.

2. Prior Art And Drawbacks

Iron and manganese fertilizers are widely used in many parts of the world particularly in soils of high pH, such as the black soils. They are also widely used in horticultural and cash crops to improve yields and quality of produce. The compounds most popularly used for correcting deficiencies of iron and manganese in crops are ferrous sulphate and manganous sulphate (J. J. Mortvedt, P. M. Giordano & W. L. Lindsay, 1972, Micronutrients in Agriculture, Soil Sci. Soc. Am., Madison). Chelated forms of these micronutrients, e.g., iron-EDTA, and manganese—EDTA compounds are also in use as liquid sprays (V. Saucheli, 1967, Chemistry and technology of fertilizers, Reinhold, N.Y.; G. H. Collins, 1955, Commercial fertilizers, Mc-Graw Hill, N.Y.).

There are, however, several drawbacks in the use of such soluble compounds as fertilizers of iron and manganese, e.g., leaching losses, chemical transformation losses, ground water contamination, etc. This results in excess dosages which are often several times the actual crop uptake, leading to poor fertilize-use efficiency Moreover, such wastages also affect the economics of iron and manganese fertilizer, thereby discouraging their widespread usage.

In an attempt to overcome these shortcomings, slow-release fertilizers incorporating iron and manganese have been prepared. One such type is the fertilizer based on phosphate glasses known as frits. Frits are prepared by fusing sodium, potassium or ammonium dihydrogen phosphates together with micronutrient salts at temperatures between 800° and 1400° C. and then rapidly quenching the melt to produce a glass (G. J. Roberts 1973,Am. Ceram. Soc. Bull. Vol 52, p 383; ibid, idem, Vol 54, p 1069; Austrian Patent No 326160 of 1975; U.S. Pat. No. 3,574,591 of 1971; U.S. Pat. No 2,713, 536 of 1974).

The major disadvantage of the phosphate glass frits is that the availability of the nutrients is by slow hydrolysis of the glass and is highly dependent on the soil (pH, moisture content, temperature, etc.,) and on the crop (rate of growth, physiological factors, variety, etc). Consequently, where nutrient release by hydrolysis does not match plant uptake, the fertilizer is not effective. Moreover, the high temperatures involved in the synthesis of frits together with the corrosive conditions make these materials fairly expensive and unsuitable for general use.

Another type of phosphate based water insoluble fertilizer is the metaphosphate. Metaphosphates of calcium and potassium together with micronutrients have been proposed (S I Volfkovich, 1972, J Appl. Chem. (USSR) Vol 45, p 2479). A Russian patent (SU 1270148 of 1986) describes the production of mixed metaphosphates based fertilizers produced at 500°-880° C. Drawbacks in the use of metaphosphates as fertilizers are similar to those with the frits. Metaphosphates may be more insoluble and hydrolyse even slower, producing compounds with very poor nutrient availability. Metaphosphates of the heavy metals are extremely insoluble and of little use as fertilizers.

An additional type of slow-release fertilizer has been produced in which the micronutrient ions are in a chemical form wherein they are insoluble but also plant available. These belong to the bio-release types of slow-release fertilizers. The processes for producing such phosphate based zinc and copper fertilizers are described in two Indian patents (Nos 172800 of 1990 and 177205 of 1991). The chemistry of zinc and copper phosphate polymerisation and the chemical nature of these fertilizers have also been described (S K Ray, C Varadachari & K Ghosh, 1993, Ind. Eng. Chem. Res. Vol. 32, p. 1218; S K Ray, C Varadachari & K Ghosh, 1997, J. Agric. Food Chem., vol. 45, p. 1447). A new patent (C. Varadachari, Indian Patent Application No. 10/CAL/99) describes the processes for production of slow-release fertilizers and describes methods for assessing limits of polymerisation.

Objectives of the Invention

An objective of this invention is to propose a process for the manufacture of bio-release iron-manganese fertilizer having all the advantages of slow-release fertilizers together with the added benefit of high nutrient availability.

Another objective of this invention is to provide a combined nutrient source of iron and manganese in a single compound. Since deficiencies of iron and manganese in soils always occur together, therefore, a fertilizer providing both nutrients would be more beneficial for crop growth.

The third objective of this invention is to provide a bio-release source of ammonium, magnesium and phosphorus, all of which are essential plant nutrients.

Still another objective of this invention is to propose a process for the manufacture of bio-release iron-manganese fertilizer, wherein only a single heating stage is required and polymerisation temperatures are lower than all previous processes.

Yet another objective of the invention is to provide a processes for producing slow-releasing, water insoluble, iron-manganese fertilizers that will show good bio-availability of the nutrients and thus provide an effective source of iron and manganese for plants.

A further objective is to provide processes, which offer substantial improvements over earlier processes, in providing a combined micronutrient source and also in terms of energy requirement

DESCRIPTION OF THE INVENTION

According to this invention, there is provided a process for the preparation of water insoluble bio-release iron-manganese fertilizer, which comprises (a) heating phosphoric acid with a mixture of (i) source of iron oxide such as goethite and hematite, (ii) pyrolusite and (iii) one or more basic compound(s) selected from oxide(s) or carbonate(s) of magnesium, calcium, sodium and potassium, (b) neutralisation followed by drying and pulverisation.

When oxide of iron [goethite i.e., FeO(OH) or hematite i.e., $Fe_2O_3$], pyrolusite ($MnO_2$) and a basic compound (oxides or carbonates of magnesium, calcium, sodium or potassium) are heated with phosphoric acid, reaction occurs to form the dihydrogen phosphates of the metal ions, which subsequently polymerise to form iron manganese polyphosphate.

Removal of free water from the system by heating facilitates the reactions. Vacuum facilitates the reaction by speeding up the removal of water. Polymerisation is allowed to continue till a product of optimum chain length is formed as determined by its chemical properties. This polyphosphate product is a viscous, acidic liquid. When neutralised with magnesia or ammonia, a light coloured suspension is formed which can be dried and ground to a free flowing, non-hygroscopic product.

Iron-Manganese Fertilizer The starting materials are yellow oxide of iron, i.e., goethite, which may contain up to 62.8% Fe or red oxide of iron, i.e., hematite containing up to 69.9% Fe, pyrolusite which may contain up to 63% Mn, magnesia which may contain up to 60.3% Mg or magnesium carbonate which may contain up to 28.8% Mg and phosphoric acid containing not more than 60% $P_2O_5$.

The raw materials, goethite and pyrolusite, are in such proportions that molar ratios of Fe:Mn=1:0.51. Although higher or lower ratios ranging from Fe:Mn =1:0 to 0:1 may be used, this ratio of 1:0.51 is considered most suitable from the point of view of crop requirements. Magnesia is added in the proportion Fe:Mg (molar ratio)=1:1.15.

With lower ratios of Mg, desirable properties are not obtained; higher ratios of Mg do not result in any particular improvement of the product or the process. Product remains tolerable with Fe:Mg molar ratios ranging from 1:0.6 to 1:1.75. However, a Fe:Mg molar ratio=1:1.15 is optimum. The Mg compound may also be replaced with a Ca compound. Thus dolomite ($CaCO_3.MgCO_3$) or limestone ($CaCO_3$) may be used. The molar proportion of Fe: cation is preferably 1:1.15 although ratios ranging from 1:0.575 to 1:1.725 may also be used. Alternatively, sodium or potassium bases may be used. In such case, the Mg is replaced by equivalent amounts of Na or K.

The molar ratio of Fe:Na/K=1:2.3 is at the optimum level. The amount of phosphoric acid added is such that all the Fe, Mn and Mg as well as impurities in the reaction mixture are converted to the dihydrogen phosphates. Thus, the Fe:Mn:Mg:P molar ratios used are 1:0.51:1.15:7.34. Lower ratios of P will result in incomplete reaction of the oxides. Higher levels of P at any level may be used but is of no particular advantage. On the contrary, this will result in excess acidity in the product that will require more bases for neutralisation.

The reactants are taken in an acid-proof brick lined reactor vessel. All the reactants are mixed together and heated at 200° C. Application of vacuum at this stage facilitates the reaction. As the reaction progresses, the colour changes from dirty yellow or red (depending on the colour of the starting material); it deepens and ultimately becomes almost black. Any temperature above 160° C. can be used for the reaction; however, temperatures of 200-250° C. give the optimum results. Temperature of liquid itself, however, remains at around 140° C. Pre-heating at lower temperatures is not required since dissolution of solids occurs during the period when liquid temperature slowly increases by absorption of external heat. As the system absorbs heat, initially, dihydrogenphosphates of iron, manganese and magnesium are formed. With further absorption of heat, polymerisation of the phosphates occurs with formation of iron manganese magnesium polyphosphate. By eliminating the initial heating period, the reaction is much faster without any loss of product quality. The reaction can be followed by observing the changes in colour, density and viscosity of the liquid. At the end of the reaction period the liquid is almost black in colour. Density changes are also useful to obtain the end-point of reaction. Density of the liquid shows a sharp increase near the end-point; it is 1.97 g/ml (in the hot state, at around 140° C.) in the product having the desired polymerisation. Viscosity changes are also sharp; viscosity increases from around 19 centipoise to 43 centipoise (at a temperature of about 140° C.) at the end-point. The polyphosphate is a flowable liquid when hot but when cooled to room temperature, it becomes a thick, highly viscous material After the end-point of reaction, if heating is further continued, the liquid becomes highly viscous and hair-like strands are formed, which solidify on cooling Further testing of the product is done by taking a small portion, neutralising with ammonia to ph 5.0-7.5. Optimum pH for neutralisation is pH 5.6-6.0. The product is tested for its solubility in 0.33M citric acid and 0.005M DTPA (diethylene triamine penta acetic acid). The product of desired degree of polymerisation is almost completely soluble in these reagents within 60 min. Higher polymerised product will leave an insoluble residue and is not a desirable material. Lower polymerised products may contain unreacted black particles (pyrolusite).

The polyphosphate, at the desired level of polymerisation, is a flowable liquid. It is poured into a container, allowed to cool to room temperature and subsequently neutralised with a basic material. Ammonia solution is preferred because time requirement for neutralisation reaction is faster compared to solid bases like magnesia, magnesium carbonate, lime, etc. However, any such basic material may be used. Optimum pH for neutralisation is 5.5-6.5. If too little base is added, the finished product will tend to become hygroscopic. Solubility in citrate and DTPA solutions will also be lower. Addition of too much of base offers no particular advantage and will also make the product more insoluble in citrate and DTPA solutions. After neutralisation, the dark blackish product changes colour to a light gray material. This is dried at temperatures <100° C., preferably at 60-80° C. It is then ground and sieved, preferably through 100 mesh.

This invention provides a substantial improvement over previous processes for the production of combined iron-manganese fertilizers. In this process the initial reaction stage to produce a homogenous mixture is eliminated. A single stage reaction, at temperatures of 160° C. or higher is sufficient to produce the polyphosphate. Thereby total time of reaction is reduced. This has been possible because of addition of $Mg^{2+}$ ions, which helps in more rapid and easier dissolution of pyrolusite. The polymerised end product remains in a liquid state, which makes material handling and transfer easier. Process control is also simplified since density and viscosity of the liquid can be continuously monitored and thereby the end-point of reaction can be readily detected.

Accordingly,-this invention provides a process for the production of multinutrient bio-release fertilizer of iron-manganese. All existing slow-releasing fertilizers of the micronutrients have nutrient release controlled by hydrolysis or diffusion mechanisms. The new bio-release forms have a superior nutrient supply mechanism, which is similar to that from the soil nutrient storehouse. Thus, in this Fe-Mn fertilizer the nutrients are present in water insoluble but simultaneously in a plant available form. The fertilizers are also non-toxic, non-hygroscopic, environment friendly, easy to apply and exhibit improved fertilizer use-efficiency.

The main advantage of this process is the significant improvement in energy use by converting a two-stage process to a single stage process. Another advantage is improvement in process control, by combining iron, manganese and magnesium, which produces liquid polyphosphates whose solubility characteristics are less sensitive to the degree of polymerisation. This is more difficult in iron-manganese systems in the absence of magnesium. Yet another advantage of this invention is the easy technique of obtaining the end-point of reaction by continually monitoring density or viscosity of the liquid. Lastly, the process is simpler and requires less energy inputs than all previous processes.

The invention will now be explained in greater detail with the help of the following non-limiting examples.

EXAMPLE 1

Phosphoric acid containing 60% $P_2O_5$ is taken in a glass beaker. To 145 g of the acid, 16 g of goethite (containing 62% Fe), 7.86 g pyrolusite (containing 63% Mn) and 8.2 g magnesia (containing 60.3% Mg) is added and stirred. The colour of the mixture at this stage is dirty yellow. The beaker is then placed in a furnace set at 200° C. Much frothing occurs as the polymerisation proceeds. After 45 min of heating, the beaker is taken out of the furnace. At this stage the colour of the liquid is almost black. A small amount is taken for density and viscosity measurements of the hot liquid. These values are about 1.97 g/ml and 43 centipoise respectively. Another portion is neutralised with ammonia to pH 5.6 and tested for its solubility in 0.33M citric acid. The desired product gives an almost clear solution within 60 min. Materials, which are much too polymerised or too little polymerised leave a residue.

The polyphosphate, when hot, is a flowable liquid. It is allowed to cool to room temperature whereupon it becomes a viscous liquid. 85 g of magnesium oxide is added to the polyphosphate with mixing. The pH of the product is, thus, raised to about 5.6. Its colour changes to very light gray. It is then dried in an oven at 80° C., ground in a mortar and sieved with 100 mesh sieve. The fertilizer contains 5.4% $Fe_2O_3$, 2.7% $MnO_2$, 18.4% MgO and 34.5% $P_2O_5$.

EXAMPLE 2

12 kg of commercial phosphoric acid containing 58.5% $P_2O_5$ is taken in an acid-proof brick lined reactor vessel with a stirrer. To this, 732 g pyrolusite (containing 51.6% Mn), 1212 g goethite (containing 62% Fe) and 1836 g magnesium carbonate (containing 20.5% Mg) are added, one after another. It suspension is stirred. Frothing occurs due to the presence of carbonate. The vessel is closed, stirring is continued and heating is started with the temperature set at 200° C. Density and viscosity of the liquid are continuously recorded and heating is stopped as the appropriate stage is reached (density of 1.97 g/ml and viscosity of around 43 centipoise). For this quantity of reactants 90 min heating is required at 200° C. The liquid is poured out into a stirrer. It is allowed to cool to nearly room temperature then 11 liter ammonia solution (25% ammonia) is slowly added with continuous stirring. A sample is taken and tested for its pH, which should be around 5.6-6.0. The suspension is poured out into trays and dried in an oven at 80° C. It is finally ground to a 100 mesh size.

The fertilizer contains 5.5% Fe, 2.8% Mn, 16% P, 3% Mg and 11% N. It is tested to be almost completely soluble in 0.33M citric acid and 0.005M DTPA.

Plant growth trials with this fertilizer were done in black cotton soil with rice, spinach and chillies as test crops. Rice produced a 45% increase at 2 kg/ha Fe and 1 kg/ha Mn as the bio-release fertilizer. Chillies gave a 179% higher yield at the same dose of bio-release fertilizer. The residual effect of the fertilizer produced a 51% increase in yield of spinach.

EXAMPLE 3

135 g commercial phosphoric acid (containing 58.5% $P_2O_5$) is mixed with 16 g hematite (containing 50.5% Fe and 2.87% Al), 7.84 g pyrolusite (containing 51.6% Mn) and 19.7 g magnesium carbonate (containing 20.5% Mg). The reactants are taken in a borosilicate glass beaker, stirred and kept in a muffle furnace set at 250° C. After 20 min the beaker is removed from the furnace. A sample is neutralised with ammonia up to a pH of 5.6 and its solubility in 0.33 M citric acid is tested. It is almost completely soluble. A light gray product is formed which is dried at 70° C. in an oven. The dried material was powdered and sieved through 100 mesh.

EXAMPLE 4

This procedure is essentially the same as described in example 1 except in the order of addition of reactants. Here phosphoric acid is taken in a beaker, pyrolusite is added to it and the mixture is heated at 200° C. for 10 min. The beaker is removed from the furnace and goethite and magnesium are added with stirring. The reactants are again heated at 200° C. for 30 min. The end product is tested as described in example 1; the finished product is also obtained as described therein.

EXAMPLE 5

This is essentially the same as example 2 except that at the neutralisation stage, 11 kg potassium carbonate is used instead of ammonia solution.

EXAMPLE 6

This is essentially the same as example 1 except that at the initial reaction stage dolomite 22.5 g (containing 21% Ca and 13% Mg) is added as an ingredient, instead of magnesium carbonate. The mixture is heated at 250° C. for 40 min to obtain the desired level of polymerisation.

EXAMPLE 7

This is essentially the same as example 1 except that at the initial reaction stage 31.8 g sodium carbonate (containing 29% Na) is used instead of magnesium carbonate. The mixture is heated at 250° C. for 100 min to obtain the desired level of polymerisation.

EXAMPLE 8

This is essentially the same as example 1 except that 8 g sodium hydroxide (containing 57.5% Na) is used instead of magnesium carbonate.

EXAMPLE 9

This is essentially the same as example 1 except that 90 g magnesium carbonate (containing 28% Mg) is used for neutralisation instead of ammonia.

EXAMPLE 10

This is essentially the same as example 1 except that at the initial reaction stage calcium carbonate 20.7 g (containing 40% Ca) is added as an ingredient, instead of magnesium carbonate. The mixture is heated at 250° C. for 50 min to obtain the desired level of polymerisation.

I claim:
1. A process for the preparation of water insoluble, bio-release iron-manganese polyphosphate fertilizer, the process consisting of
   a) heating phosphoric acid at a temperature of at least 160° C. with a mixture consisting essentially of (i) a source of iron oxide including one or more substance selected from the group consisting of goethite and hematite, (ii) pyrolusite and (iii) one or more basic compound selected from the group consisting of magnesium oxide(s), magnesium carbonate, calcium oxide, sodium oxide, potassium oxide, calcium carbonate, sodium carbonate, and potassium carbonate for a time period ranging from 20 minutes to 2 hours to produce a liquid polyphosphate;

b) neutralizing the liquid polyphosphate at a pH of 5 to 7.5, wherein the neutralized liquid polyphosphate is characterized by solubility in 0.33M citric acid and 0.005M DTPA;

c) drying the neutralized liquid polyphosphate to obtain a solid; and d) pulverizing the solid.

2. A process as claimed in claim 1 wherein the iron oxide and pyrolusite are used in any of the molar ratios Fe:Mn=1: 0.1 to 0.1:1.

3. A process as claimed in claim 1 wherein if the one or more basic compound includes magnesium oxide(s), magnesium carbonate, calcium oxide or calcium carbonate, the molar ratio of Fe:Mg/Ca is between 1:0.6 to 1:1.75.

4. A process as claimed in claim 1 wherein if the one or more basic compound includes sodium oxide, sodium carbonate, potassium oxide, or potassium carbonate, the molar ratio of Fe:Na/K is between 1:1.2 to 1:3.5.

5. A process as claimed in claim 3 wherein the one or more basic compound is magnesium oxide(s) or magnesium carbonate.

6. A process as claimed in claim 1 wherein the phosphoric acid is of a strength up to 60% $P_2O_5$.

7. A process as claimed in claim 1 wherein the phosphoric acid is in an amount equal to or greater than that required to convert all cations in the reaction mixture to dihydrogen orthophosphates.

8. A process as claimed in claim 1 wherein step (a) is carried out at a temperature of 200-250° C.

9. A process as claimed in claim 8 wherein the extent of polymerization is judged by chemical tests of the solubility of the neutralized polyphosphate in organic chelates selected from the group consisting of 0.33M citric acid and 0.005M DTPA.

10. A process as claimed in claim 1 wherein the liquid polyphosphate is neutralized with a base to any pH within 5 to 7.5.

11. A process as claimed in claim 1 wherein the base for neutralization in step (b) is selected from the group consisting of magnesia, magnesium carbonate, lime and ammonia.

12. A process as claimed in claim 11 wherein the base for neutralization is ammonia.

13. A process as claimed in claim 1 wherein the neutralized liquid polyphosphate is dried to a solid form at temperatures not exceeding 100° C.

14. A process as claimed in claim 13 wherein the dried solid is pulverized to a powdery form.

15. A process as claimed in claim 2 wherein the phosphoric acid is in an amount equal to or greater than that required to convert all cations in the reaction mixture to dihydrogen orthophosphates.

16. A process as claimed in claim 3 wherein the phosphoric acid is in an amount equal to or greater than that required to convert all cations in the reaction mixture to dihydrogen orthophosphates.

17. A process as claimed in claim 4 wherein the phosphoric acid is in an amount equal to or greater than that required to convert all cations in the reaction mixture to dihydrogen orthophosphates.

18. A process as claimed in claim 5 wherein the phosphoric acid is in an amount equal to or greater than that required to convert all cations in the reaction mixture to dihydrogen orthophosphates.

19. A process as claimed in claim 6 wherein the phosphoric acid is in an amount equal to or greater than that required to convert all cations in the reaction mixture to dihydrogen orthophosphates.

* * * * *